(12) United States Patent
Lindsay

(10) Patent No.: US 7,735,927 B2
(45) Date of Patent: Jun. 15, 2010

(54) ANTI-BACKLASH RESISTANT GEARING FOR A SEAT MECHANISM

(75) Inventor: Derek Lindsay, Marysville, OH (US)

(73) Assignee: HONDA MOTOR Co., Ltd., Tokyo (JP)

( * ) Notice: Subject to any disclaimer, the term of this patent is extended or adjusted under 35 U.S.C. 154(b) by 114 days.

(21) Appl. No.: 11/460,722

(22) Filed: Jul. 28, 2006

(65) Prior Publication Data

US 2008/0023998 A1 Jan. 31, 2008

(51) Int. Cl.
*A47C 1/00* (2006.01)

(52) U.S. Cl. ............... 297/344.17; 297/228.12; 297/17; 297/362

(58) Field of Classification Search ............ 297/228.12, 297/17, 362
See application file for complete search history.

(56) References Cited

U.S. PATENT DOCUMENTS

| | | | | |
|---|---|---|---|---|
| 1,033,468 A * | 7/1912 | Raymond | ............... | 74/440 |
| 1,748,820 A * | 2/1930 | Alexandrescu | ............... | 74/440 |
| 2,092,888 A * | 9/1937 | Maccoul | ............... | 74/440 |
| 2,310,232 A * | 2/1943 | Hale | ............... | 74/440 |
| 2,311,902 A * | 2/1943 | Roethel, Jr. | ............... | 74/440 |
| 2,607,238 A * | 8/1952 | English et al. | ............... | 74/440 |
| 3,365,973 A * | 1/1968 | Henden | ............... | 74/409 |
| 4,371,207 A * | 2/1983 | Wilking et al. | ............ | 297/344.15 |
| 4,407,544 A * | 10/1983 | Bahring | ............... | 297/362 |
| 4,529,159 A * | 7/1985 | Terada et al. | ............... | 248/421 |
| 4,698,571 A * | 10/1987 | Mizuta et al. | ............ | 318/568.1 |
| 4,747,321 A * | 5/1988 | Hannel | ............... | 74/440 |
| 5,048,786 A * | 9/1991 | Tanaka et al. | ............... | 248/429 |
| 5,056,613 A * | 10/1991 | Porter et al. | ............... | 180/178 |
| 5,775,661 A * | 7/1998 | Matsumoto et al. | ......... | 248/421 |
| 5,870,928 A * | 2/1999 | Genter et al. | ............... | 74/440 |
| 6,158,811 A * | 12/2000 | Hofschulte et al. | ......... | 297/362 |
| 6,224,157 B1 * | 5/2001 | Di Luccio | ............... | 297/362 |
| 6,293,166 B1 * | 9/2001 | Genter et al. | ............... | 74/440 |
| 6,402,248 B1 * | 6/2002 | Lloyd et al. | ............... | 297/362 |
| 6,428,104 B1 * | 8/2002 | Sakamoto et al. | ......... | 297/362.11 |
| 6,733,076 B2 * | 5/2004 | Grable et al. | ............... | 297/362 |
| 6,749,169 B2 * | 6/2004 | Becker et al. | ............... | 248/421 |
| 6,997,079 B2 * | 2/2006 | Nomura et al. | ............... | 74/440 |
| 7,066,540 B2 * | 6/2006 | Minai et al. | ............ | 297/344.15 |
| 7,192,090 B2 * | 3/2007 | Sakamoto | ............ | 297/362.14 |
| 7,278,689 B2 * | 10/2007 | Guillouet | ............... | 297/362 |
| 7,281,765 B2 * | 10/2007 | Scholz et al. | ............... | 297/362 |
| 7,322,654 B2 * | 1/2008 | Kawashima | ............... | 297/362 |
| 7,354,108 B2 * | 4/2008 | Matsumoto et al. | ......... | 297/362 |
| 2005/0121585 A1 * | 6/2005 | Minai et al. | ............... | 248/422 |
| 2008/0164741 A1 * | 7/2008 | Sakamoto | ............... | 297/362 |

* cited by examiner

*Primary Examiner*—Katherine W Mitchell
*Assistant Examiner*—Philip S Kwon
(74) *Attorney, Agent, or Firm*—Kenealy Vaidya LLP

(57) ABSTRACT

A vehicle seat assembly includes an anti-backlash mechanism in the seat adjustment gearing to reduce or eliminate gaps that cause looseness in the gearing.

12 Claims, 2 Drawing Sheets

ANTI-BACKLASH RESISTANT GEARING FOR A SEAT MECHANISM

BACKGROUND OF THE INVENTION

1. Field of the Invention

The present invention relates to devices, systems, and processes useful as vehicle seat assemblies, and more specifically to anti-backlash mechanisms in the seat adjustment drive mechanisms of such vehicle seat assemblies.

2. Brief Description of the Related Art

Anti-backlash gear mechanisms are well known in the art to provide a useful way of reducing or eliminating gaps between the teeth of driving and driven gears. By way of example, several U.S. patents describe such anti-backlash mechanisms, including U.S. Pat. Nos.: 1,748,820, 2,092,888, 2,310,232, 2,311,902, 2,607,238, 3,365,973, 5,056,613, and 6,293,166.

A problem in current vehicle seating design is that, while seat assemblies are being constructed to be more adjustable in numerous ways, and those adjustment mechanisms are often driven by drive motors, looseness in the adjustment mechanism can arise. Regardless of the source of this looseness, e.g., by too large a manufacturing tolerance of the component pieces or wear of the interacting parts, looseness can be perceived by the vehicle user as a fault in the mechanism, and in general is preferable to avoid.

Currently, vehicle seat adjustment mechanisms often employ simple gear reductions or worm-gear mechanisms to transform the rotation of a high RPM, low torque drive motor of the seat assembly into a desired recliner, height, and/or slide motion of the power seat. Typically, tolerances are kept very tight to reduce initial looseness; however, that initial looseness is invariably present, and can become more pronounced as the assemblies components wear.

There thus remains a need in vehicle seating assemblies to reduce or eliminate gaps in the gearing of the adjustment mechanisms of the seat assemblies, and thereby reduce or eliminate looseness in these adjustment mechanisms.

SUMMARY OF THE INVENTION

According to a first aspect of the invention, a vehicle seat assembly comprises a seat portion against which a user of the seat can be positioned, and an anti-backlash gear mechanism attached to the seat portion, the anti-backlash gear mechanism including a first gear having first gear teeth, the first gear attached to the seat portion, a second gear substantially similar to the first gear and having second gear teeth, at least one spring attaching the first gear to the second gear such that the first gear teeth and the second gear teeth are adjacent to and offset from each other, and a third gear having third gear teeth mating with said first teeth and said second teeth, wherein the at least one spring biases the second gear teeth against the third gear teeth.

According to another aspect of the present invention, a vehicle comprises at least one of these vehicle seat assemblies.

Still other aspects, features, and attendant advantages of the present invention will become apparent to those skilled in the art from a reading of the following detailed description of embodiments constructed in accordance therewith, taken in conjunction with the accompanying drawings.

DETAILED DESCRIPTION OF EXEMPLARY EMBODIMENTS

Figure 1:
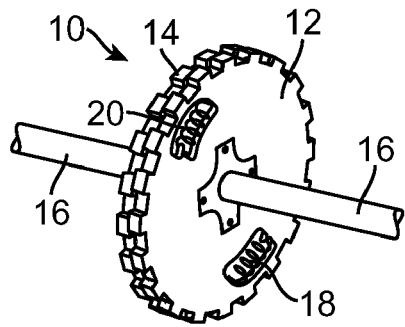
FIG. 1 illustrates a perspective view of an anti-backlash mechanism in accordance with the present invention.

FIG. 1 illustrates a perspective view of an exemplary embodiment of an anti-backlash mechanism 10 in accordance with principles of the present invention. The mechanism 10 includes a first gear 12 and second gear 14 which is substantially the same as and mounted next to the first gear. The gear 12 is mounted to a drive shaft 16 which, when rotated, rotates the gear 12. The first 12 and second 14 gears are attached to each other by springs 18, 20, described in greater detail below.

Figure 2:
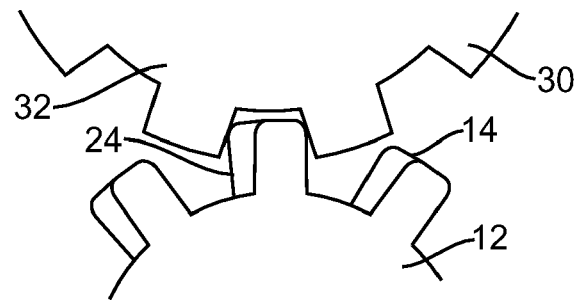
FIG. 2 illustrates an enlarged view of portions of an anti-backlash mechanism of the present invention interacting with a drive pinion.

FIG. 2 illustrates an enlarged view of portions of an anti-backlash mechanism 10 of the present invention, interacting with a drive pinion 30. The gears 12, 14 have teeth 22, 24, respectively, which are driven by the teeth 32 of the pinion 30. Because the second gear 14 is connected to the gear 12 via springs 18, 20, and the springs bias the first and second gears 12, 14 in a circumferential direction, gaps between the teeth 22, 32, are bridged by the teeth 24 of the second gear 14, thus reducing or eliminating looseness between the driving (30) and driven (12) gears. Of course, an anti-backlash mechanism in accordance with the present invention can instead be incorporated in the drive gear as well as, or instead of, in the driven gear.

Figure 3:
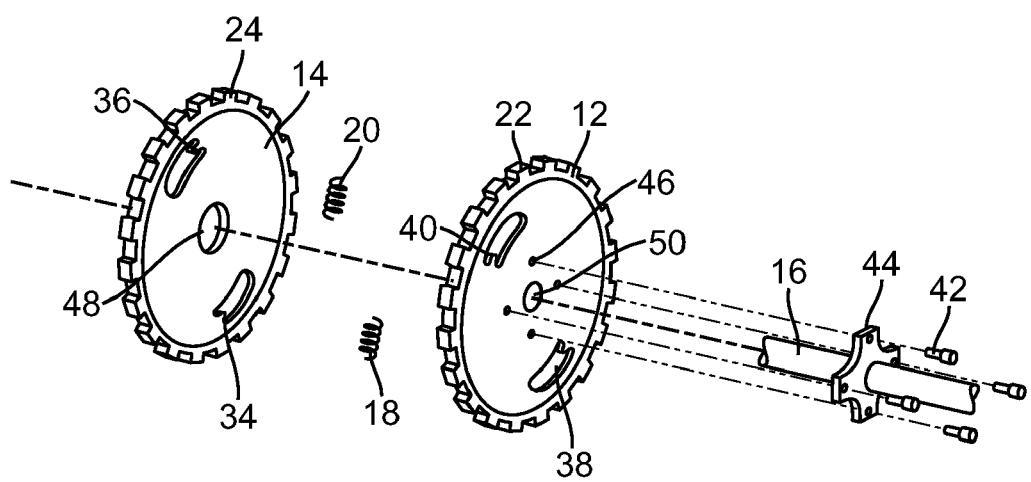
FIG. 3 illustrates an exploded perspective view, with portions shown in phantom, of the mechanism of FIG. 1.

FIG. 3 illustrates an exploded perspective view, with portions shown in phantom, of the mechanism 10 of FIG. 1 when driven by a shaft 16 rather than a pinion 30. The springs 18, 20 are mounted on pins 34, 38 and 36, 40, respectively, and thus bias the gears 12, 14 in a known manner. The first gear 12 includes a hole 50 through which the shaft 16 passes, while the second gear 14 includes a similar hole 48 through which the shaft can pass without interfering with the rotation of the second gear 14. The shaft is mounted to rotate and drive the first gear 12, e.g., by including a plate 44, secured to the shaft, through which bolts 42 pass and fixedly attach the plate to holes 46 in the first gear 12. The present invention is not limited to this particular embodiment of structures which attach a drive shaft to the first gear 12, and other mechanisms are within the scope of the present invention. As well known to those of skill in the art, the spring loaded connection of the gears 12, 14, resists backlash by taking up slack between the gear 12 and the pinion 30, which can be present because of manufacturing tolerances and wear on the teeth 22, 32.

Figure 4:
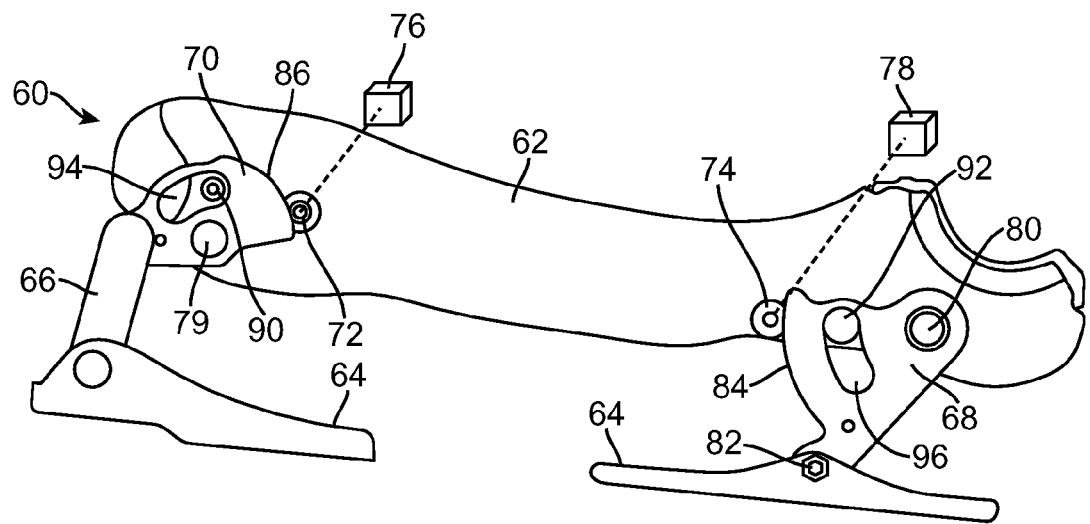
FIG. 4 illustrates portions of a vehicle seat assembly incorporating an anti-backlash mechanism of the present invention.

FIG. 4 illustrates portions of a vehicle seat assembly 60 incorporating an anti-backlash mechanism 10 of the present invention. The seat assembly 60 includes a seat bottom 62; other portions of the seat against which a user of the seat can be positioned, such as the seat back (see FIG. 5) are not illustrated so as to not obscure aspects of the present invention. The seat bottom 62 is mounted to the vehicle at mounting brackets 64, which may be stationary or themselves mounted to displace forward and backward, in well know manners. One or more links 66 connect the brackets 64 to one or more front sector gear assemblies 70, which are movably mounted to the seat bottom, while one or more rear section gear assemblies 68 extend between a pivot point 82 on the bracket 64 and a pivot point 80 at the seat bottom 62.

In the exemplary embodiment illustrated in FIG. 4, each of the sector gear assemblies 68, 70, include gear teeth 84, 86, which mate with correspondingly configured teeth (not labelled; see FIG. 2) of drive pinions 74, 72, respectively. The drive pinions 72, 74, are rotatably driven by a one or a pair of controllable motors 76, 78, illustrated in simplified form. Furthermore, in this embodiment, the forward sector gear assembly 70 includes a pivot point 79 around which the gear assembly 70 can rotate. Alternatively, instead of a pinion drive, the sector gear assemblies 68, 70 can be attached to and driven by a driveshaft, as described above with reference to FIGS. 1, 3, e.g., attached to at the pivot points 79, 80, while the pinions 72, 74 are attached to the seat bottom 62. The seat bottom 62 is movably attached to and supported on each sector gear assembly 68, 70, via pins 90, 92, sliding in slots 94, 96 formed in the gear assemblies.

One or both of the sector gear assemblies 68, 70 include first and second gears, connected together by springs mounted on pins, as described above. Alternatively and in more general terms, one or both of the sector gear assemblies 68, 70 include anti-backlash mechanisms as described herein, or alternatively as known to those of ordinary skill in the art, e.g., those described in the aforementioned U.S. patents.

Figure 5:
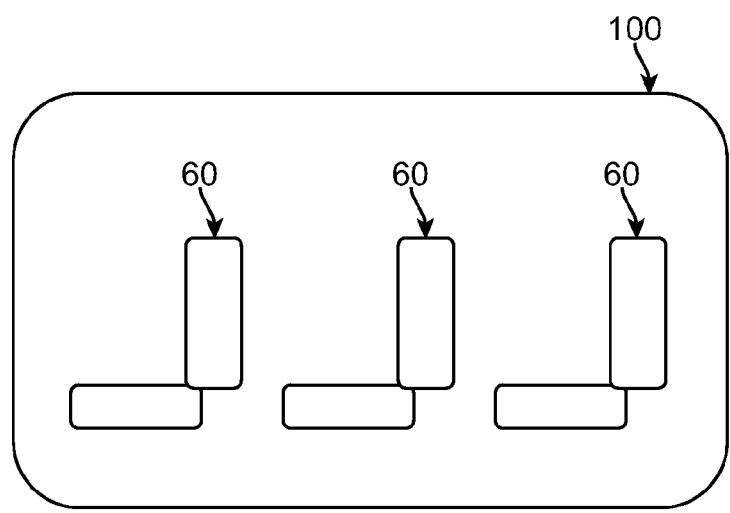
FIG. 5 illustrates a highly simplified view of a vehicle including vehicle seat assemblies in accordance with the present invention.

FIG. 5 illustrates a highly simplified view of a vehicle 100 including vehicle seat assemblies 60 in accordance with the present invention. The vehicle 100 can be any known vehicle, including, but not limited to: automobiles; trains; airplanes; boats; and any other vehicle which has a seat.

With continued reference to FIG. 4, operation of the seat assembly 60 will be described. As previously established, there often in a gap or play between a drive gear and a driven gear in vehicle seat assemblies, such as assembly 60, and more particularly between pinions 72, 74, and the sector gear assemblies 68, 70, as a result of manufacturing tolerances and/or gear tooth wear. Thus, when the pinions 72, 74 rotate, rotating the assemblies 68, 70 about their respective rotation points 80, 79, the respective portions of the seat bottom 62 are raised (or lowered, depending on the drive direction) as the pins 90, 92 ride in the slots 94, 96 of the sector gear assemblies. During this process, the springs 18, 20 (see FIGS. 1-3) urge the second gear 20 to maintain contact with the drive gear, thus reducing or even eliminating the gap between the drive and driven gears.

The present invention is not limited to the particular embodiment described above, that is, incorporated into the mechanism which selectively raises and lowers a vehicle seat. More particularly, the present invention also extends to application to manual or power adjustment of any vehicle seat position, including recline position, height, and/or sliding motion of a power or manual vehicle seat.

While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A vehicle seat assembly comprising:
    a seat portion against which a user of the seat can be positioned; and
    an anti-backlash gear mechanism attached to the seat portion, the anti-backlash gear mechanism including
        a first gear having first gear teeth;
        a drive motor attached to the first gear;
        a second gear substantially similar to the first gear and having second gear teeth;
        at least one spring attaching the first gear to the second gear such that the first gear teeth and the second gear teeth are adjacent to and offset from each other; and
        a third gear having third gear teeth mating with said first teeth and said second teeth, the third gear attached to the seat portion;
    wherein the at least one spring biases the second gear teeth against the third gear teeth;
    wherein the seat portion includes a front portion and a rear portion, and wherein the anti-backlash gear mechanism is a first anti-backlash gear mechanism and is directly attached to the front portion of the seat portion, and said seat assembly further comprising:
    a second anti-backlash gear mechanism directly attached to the rear portion of the seat portion, the second anti-backlash gear mechanism including:
        a fourth gear having fourth gear teeth;
        a second drive motor attached to the fourth gear;
        a fifth gear substantially similar to the fourth gear and having fifth gear teeth;
        at least one spring for the second anti-backlash gear mechanism attaching the fourth gear to the fifth gear such that the fourth gear teeth and the fifth gear teeth are adjacent to and offset from each other;
        a sixth gear having sixth gear teeth mating with said fourth teeth and said fifth teeth, the sixth gear attached to the seat portion; and
        wherein the at least one spring for the second anti-backlash gear mechanism biases the fifth gear teeth against the sixth gear teeth; and
    a first bracket connected to the third gear of the first anti-backlash gear mechanism via a link member.

2. A vehicle seat assembly according to claim 1, further comprising:
    at least two pins, wherein the first gear and the second gear each comprise at least one of said at least two pins, the at least one spring mounted over the at least two pins to bias the gears in a circumferential direction.

3. A vehicle seat assembly according to claim 1, further comprising:
    a drive shaft attached to the first gear; and
    wherein the drive motor is attached to the drive shaft.

4. A vehicle seat assembly according to claim 1, wherein the seat portion comprises a seat bottom.

5. A vehicle seat assembly according to claim 1, wherein the seat portion comprises a seat back.

6. A vehicle comprising at least one seat assembly according to claim 1.

7. A vehicle according to claim 6, wherein the vehicle is selected from the group consisting of an automobile, a train, an airplane, and a boat.

8. A vehicle according to claim 6, wherein the vehicle comprises an automobile.

9. A vehicle according to claim 1, wherein the link member is pivotally connected to the first bracket and the third gear of the first anti-backlash gear mechanism.

10. A vehicle according to claim 1, wherein at least one of the third gear of the first anti-backlash gear mechanism and the sixth gear of the second anti-backlash gear mechanism is a section gear.

11. A vehicle according to claim 1, wherein the sixth gear of the second anti-backlash gear mechanism is directly attached to a second bracket.

12. A vehicle according to claim 11, wherein the sixth gear of the second anti-backlash gear mechanism is pivotally attached to a second bracket.

\* \* \* \* \*